United States Patent [19]
Gropper et al.

[11] 3,847,484
[45] Nov. 12, 1974

[54] SCHLIEREN OPTICAL SYSTEM EMPLOYING A LASER LIGHT SOURCE

[75] Inventors: Lee Gropper, Los Altos Hills; Douglas H. Durland; Maurice Galasso, both of Palo Alto, all of Calif.

[73] Assignee: Beckman Instruments, Inc., Fullerton, Calif.

[22] Filed: Feb. 28, 1973

[21] Appl. No.: 336,557

[52] U.S. Cl. ............................................. 356/129
[51] Int. Cl. .......................................... G01n 21/46
[58] Field of Search .................................... 356/129

[56] References Cited
OTHER PUBLICATIONS

Grossin et al., "Schlieren Visualization Device Allowing an Arbitrary Orientation of the Lines With Respect to the Scanning Direction," 10 Applied Optics 201

*Primary Examiner*—John K. Corbin
*Assistant Examiner*—Conrad Clark
*Attorney, Agent, or Firm*—Robert J. Steinmeyer; F. L. Mehlhoff

[57] ABSTRACT

This invention provides an improved schlieren optical system for use in analytical ultracentrifuges. The improvement comprises substituting a source of laser light in combination with a focusing lens and a cylinder lens in place of the conventional line source of light in the schlieren optical system. An advantage of the invention is that laser light is more intense than other light and does not require water cooling.

1 Claim, 2 Drawing Figures

PATENTED NOV 12 1974　　　　　　　　　　　　3,847,484

SCHLIEREN OPTICAL SYSTEM EMPLOYING A LASER LIGHT SOURCE

BACKGROUND OF THE INVENTION

Analytical ultracentrifuges are used to study the distribution of molecules in solution under the influence of a centrifugal force. A solution of the molecules to be studied is placed in a cell having optical windows. The cell is then rotated at high speeds at which centrifugal forces cause the molecules to move outward and form concentration gradients which can be observed optically. One optical system commonly used for observing such concentration gradients is the schlieren system. The schlieren system is based on the fact that the concentration gradient is also a refractive index gradient. In the schlieren system, light rays passing through the cell are deviated by different amounts depending on the refractive index gradient, which corresponds to the concentration gradient. The schlieren system translates these deviations into a pattern showing change in refractive index as a function of distance from the axis of rotation.

The light rays employed in conventional schlieren systems are derived from a line source, such as a mercury arc lamp. The line source is in the focal plane of a collimating lens, which collimates the rays in a plane normal to the line source. After passing through the collimating lens, the light rays pass through the cell, where the rays passing through the refractive index gradient are deviated in the direction of increasing refractive index gradient, which is in a direction normal to the line source. The rays are then focused by a condensing lens to form images of the line source on a device known as a schlieren analyzer. The schlieren analyzer contains a diagonal slit which is crossed by each image of the line source. At each point where an image of the line source crosses the diagonal slit, the group of rays of light intersecting to form that point of the line image continue through the analyzer. The rays continuing through the analyzer are focused by a camera lens and a cylinder lens onto an image screen, where a light pattern representing the concentration gradient in the cell is formed. (In some schlieren systems the analyzer contains a wire or other element instead of a slit, with the result that a shadow pattern is formed instead of a light pattern, but the principle is the same.)

A line source of light is employed in a conventional schlieren system because the deviated images of the light source at the schlieren analyzer must cross the diagonal slit in order for the analyzer to translate the deviations of the images of the light source into a pattern representing the concentration gradient. If a point source of light were employed in a conventional schlieren system, the deviations of the point would not cross the slit and therefore would not pass through the analyzer. The only light passing through the analyzer would be undeviated light, which would give no information about the refractive index gradient in the cell.

It would be desirable to employ a laser as a source of light because it is more intense and, unlike the source of light conventionally employed in schlieren systems, does not require water cooling. However, since laser light is derived from a point source, it would not appear to be suitable in a schlieren system.

SUMMARY OF THE INVENTION

This invention provides an improved schlieren optical system of the type comprising a source of light, a collimating lens, a condensing lens, a schlieren analyzer, a camera lens, a cylinder lens, and an image screen. The improvement comprises utilizing as the source of light a source of laser light and including in the system between the source of light and the collimating lens a focusing lens and a second cylinder lens. The focal plane of the focusing lens is at the focal plane of the collimating lens; and the second cylinder lens is between the collimating lens and the focal plane of the focusing lens.

DETAILED DESCRIPTION

Figure 1:
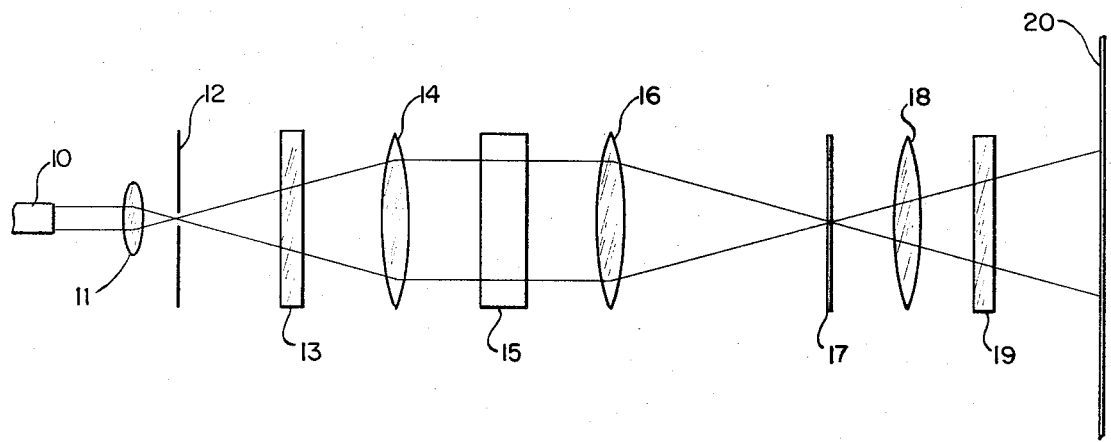
FIG. 1 is a top view of the optical system of this invention.
Figure 2:
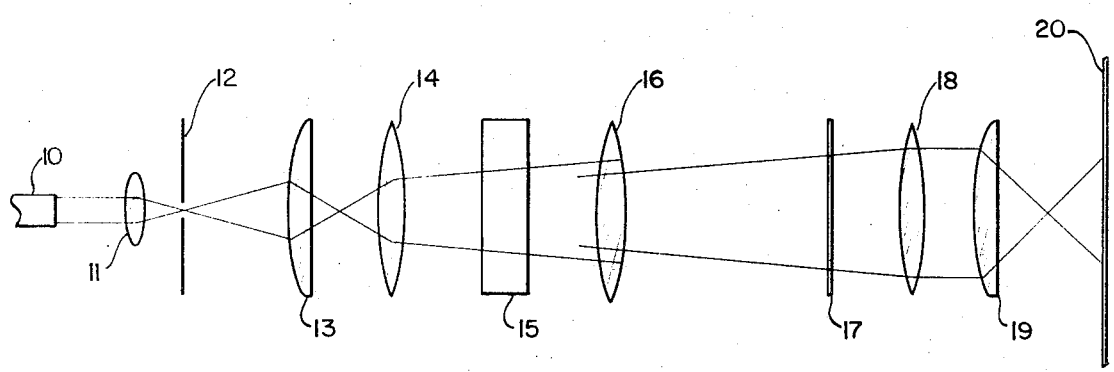
FIG. 2 is a side view of the optical system of this invention.

A laser 10 provides a high intensity light which is focused through a focusing lens 11 to a point at a stripping hole 12. The light emerges from the stripping hole 12 as a cone of divergent rays, which pass through a cylinder lens 13. The cylinder lens 13 has no power in the horizontal plane but acts upon the light in the vertical plane to form a fan of light originating at the focal point of the cylinder lens 13, as shown in FIG. 2. From the cylinder lens 13, the light passes through a conventional collimating lens 14. The focal point of the collimating lens 14 is at the focal point of the focusing lens 11, so the rays of light passing through the collimating lens 14 are parallel in the horizontal plane, as shown in FIG. 1. However, in the vertical plane, the rays are only made less divergent, rather than parallel, because they diverge from the focal point of the cylinder lens 13, rather than from the focal point of the focusing lens 11. From the collimating lens 14 the light passes through a cell 15 containing a solution having a refractive index gradient which causes the light passing through it to be deviated. The refractive index gradient is caused by a centrifugal force acting in a direction in the vertical plane. After passing through the cell, the light is focused by a condensing lens 16 onto a conventional schlieren analyzer 17. The light striking the schlieren analyzer 17 is not an image of the source of light, as in a conventional schlieren system, but is simply an astigmatic representation of the point source of light. The light continues from the analyzer 17 through a camera lens 18 and a cylinder lens 19 to form a schlieren pattern on a film 20. The pattern formed is the same as that which would be formed in a conventional schlieren system.

Although the pattern formed is the same, the system of the invention differs from the coventional system in a number of important respects. In the conventional system a full cone of rays originates from each point along the line source. Since the line source is at the focal point of the collimating lens, these rays are collimated in the vertical plane (the plane normal to the line). Then, after passing through the cell and the condensing lens, the rays are collected to form a true image of the line source at the schlieren analyzer. In the system of the invention, on the other hand, laser light is focused to a point at the focal point of the collimating lens; and an intervening cylinder lens forms a line image of the point, but the line image is not at the focal point of the collimating lens, with the result that the fan of light stemming from the line image, although rendered less divergent, is not collimated by the collimating lens in the vertical plane. However, all rays are parallel in the horizontal plane, which is not the case in the conventional system, wherein the light emanates from a continuum of points in the horizontal plane. A line image is recovered at the schlieren analyzer in the system of the invention, but the line image is not a true image of the source of light, as in the conventional system, but rather is an astigmatic representation of the source.

Thus, one would expect that in order to produce the desired pattern at the image plane using the optical components of the conventional system, it would be necessary to place at the focal point of the collimating lens a line source of light producing a full cone of rays from each point on the line and to collimate these rays in the vertical plane and then collect them to form a true image of the line source at the schlieren analyzer. Since none of these conditions exist in the system of the invention, it would not have been expected that the desired pattern would be obtained. Moreover, in the system of the invention the light source does not require water cooling, and the light produced is more intense.

Although the invention has been described with particular reference to the schlieren optical system in an analytical ultracentrifuge, the invention can be applied to any schlieren optical system.

We claim:

1. In a schlieren optical system comprising a source of light and in consecutive order from said source of light, a collimating lens, a condensing lens, a schlieren analyzer, a camera lens, a cylinder lens, and an image screen, the improvement wherein the source of light is a source of laser light and the system includes a focusing lens and a second cylinder lens between the source of light and the collimating lens of the schlieren system, the focal plane of the focusing lens being at the focal plane of the collimating lens of the schlieren system and the second cylinder lens being located at a point between the collimating lens and the focal plane of the focusing lens.

* * * * *